Figure 1:
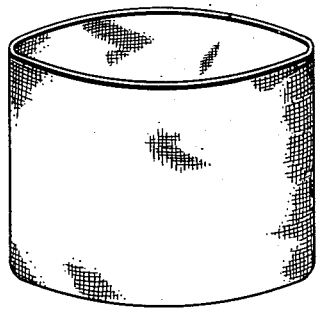

Oct. 28, 1952 — O. G. DIXON — 2,615,832
TREATMENT OF GASES OR VAPORS WITH LIQUIDS
Filed Oct. 8, 1946 — 2 SHEETS—SHEET 1

Inventor
OLAF G. DIXON
By Cushman, Darby & Cushman
Attorney

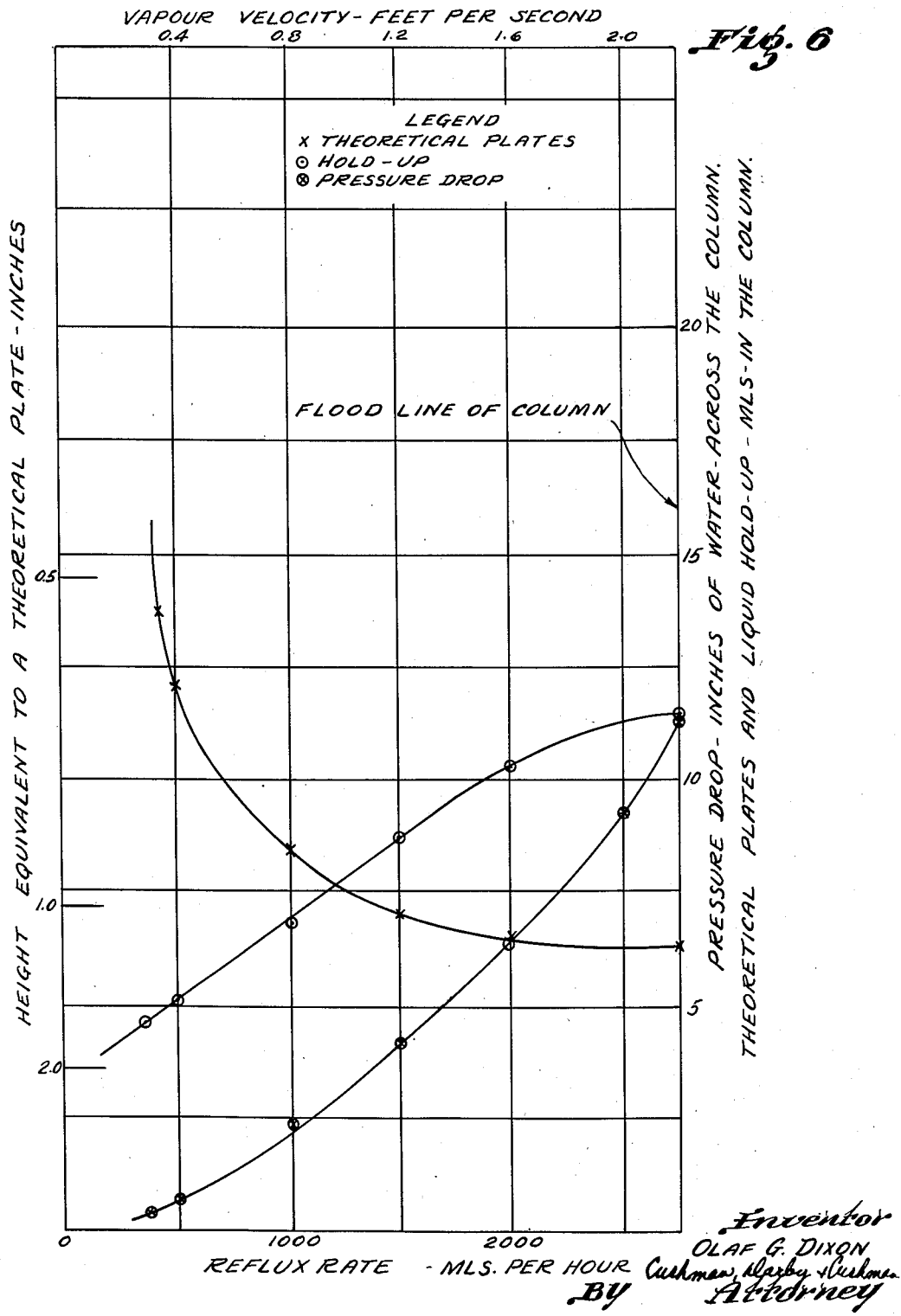

Patented Oct. 28, 1952

2,615,832

UNITED STATES PATENT OFFICE 2,615,832

TREATMENT OF GASES OR VAPORS WITH LIQUIDS

Olaf George Dixon, Norton-on-Tees, England, assignor to Imperial Chemical Industries Limited, a corporation of Great Britain Application October 8, 1946, Serial No. 702,048
In Great Britain June 16, 1943

5 Claims. (Cl. 202—40)

This invention relates to a process for the treatment of fluids with liquids and in particular to a process in which intimate contact of gases and vapours with liquids is desired, and is a continuation in part of application U. S. Serial No. 532,197 filed April 21, 1944, now abandoned.

In processes for the treatment of fluids with liquids it has been customary to provide large surfaces on which intimate contact between the fluid and liquid can take place. For example, there have been used columns packed with filling bodies manufactured from a wide variety of materials and having a wide variety of shapes, such filling bodies being irregularly placed i. e. "random packed" in the column or have been arranged according to a regular pattern. In an endeavour to obtain enhanced efficiency it has been proposed to use as the packing of such columns, hollow filling bodies in the form, for example, of cylinders, saddles and truncated cones, such filling bodies being made from wire netting or gauze. While the use of columns packed with filling bodies made from wire netting or wire gauze was attended by improved efficiency as compared with columns packed with filling bodies having solid walls, such as porcelain or metal rings, it was recognised that they were not entirely satisfactory. In the case of distillation columns packed with filling bodies made from wire netting or wire gauze improved results could be obtained by giving the filling bodies in the column a preliminary wetting by running the column at a rate above its capacity until it became completely flooded followed by reducing the rate of distillation until the flood subsided and then setting the rate at the point desired for distillation.

The present invention provides a process whereby there is obtained improved operation of columns packed with filling bodies, when used, for example, in distillation, adsorption and extraction processes.

According to the present invention there is provided a process for treating fluids with liquids in a column at least a part of which is packed as hereinbefore defined, with substantially hollow filling bodies made from woven material, the apertures of the woven material being of such a size that they can be maintained completely sealed by the liquid under the operating conditions, in which prior to treating the said fluids with liquids the column is flooded with liquid so as to seal the said apertures, introducing liquid at the top of the column at a rate such that on deflooding the column the said openings under the operating conditions are maintained completely sealed with the liquid being used, subsequently deflooding the column, while maintaining the rate of flow of the fluid being treated sufficiently low so as not to break the said sealing.

When substantially hollow filling bodies are used they may, if desired, be freely packed as hereinafter defined. In this specification a column is understood to be freely packed with filling bodies when at any cross section the ratio of the smallest cross-sectional dimension of the packed column to the greatest dimension of the filling bodies at that section is not less than 4 to 1, irrespective of whether the column is "random packed" i. e. packed indiscriminately with filling bodies or whether they are arranged according to a regular pattern.

An essential feature of the invention, when filling bodies made from woven materials are used, is that the apertures in the filling bodies are maintained completely sealed with the liquid being used. This condition may be established by completely flooding the column with liquid and thereafter maintaining a sufficient flow of liquid down the column to maintain the sealing. The minimum rate of liquid flow down the column for maintaining complete sealing of the apertures in the filling bodies will depend for example, on the surface tension of the liquid being used, the material from which the filling bodies are made, the size of the apertures in the filling bodies and the rate of flow of the fluid being treated, but can be readily determined by a simple preliminary trial of the apparatus.

It is recognized that the broad idea of flooding distillation columns prior to use is conventional, as shown, e. g., in Industrial and Engineering Chemistry, Industrial Edition 30 (1938), page 297, and Analytical Edition 1939, page 285. In contradistinction to this known method, the present invention employs one of the following procedures for wetting the filling bodies, in each of which, it will be noted, the rate of flow of gas or vapour up the column during both the flooding and the deflooding is never substantially above that at which the process (e. g., with complete sealing of the openings of the filling bodies continuously maintained) is to be operated.

The column should be flooded with the liquid to be used by one of the following methods.

*Method A.*—Liquid is introduced at the top of the column and a temporary hold up of the liquid arranged at the bottom of the column, for example, by means of an adjustable orifice until the column is completely full of liquid. After flooding the column, a rate of flow of liquid down the column is arranged such that when filling bodies made from woven materials are used the quantity of liquid is at least sufficient to maintain the apertures in the packing sealed with liquid under the conditions of operation. With the forms of packing made from other than woven material hereinafter defined, the rate of flow of liquid down the column should be sufficient to maintain the operation of the column at its highest efficiency at the desired gas or vapour velocity up the column.

In the case of distillation apparatus this flow of liquid may be obtained as reflux liquid When this flow of liquid is arranged the column is gradually deflooded by opening the adjustable orifice.

*Method B.*—In the case of a packed column attached to a boiler for distillation purposes and fitted with a reflux condenser, the boiler, and if necessary part of the column may be completely filled with liquid to be distilled and subsequently heated, whereby the liquid boils and ascends the column and completely floods the packing therein. Then, after adjusting the rate at which reflux liquid is returning to the column to that at which either the apertures of the packing of the column can be maintained completely sealed, or at which the column is operating at its highest efficiency at the desired gas or vapour velocity up the column when the forms of packing other than woven material hereinafter defined are used, liquid is removed from the boiler until a suitable level is attained and distillation is commenced, ensuring that reflux liquid continues to flow down the column at the above-mentioned rate.

*Method C.*—In distillation apparatus, the column may be isolated from the boiler and filled with the cold liquid to be distilled whereby the packing is completely flooded. The liquid is then allowed to flow into the boiler and heating commenced, at the same time continuously circulating a portion of the liquid to the top of the column, whereby the column is maintained full of liquid, until the quantity of reflux liquid passing down the column will be sufficient to maintain the sealing of the apertures in any packing materials made from woven material, or with the forms of packing made from other than woven material hereinafter defined, sufficient to maintain operation of the column at its highest efficiency, whereupon the circulation of liquid can be stopped. By this means the column is gradually deflooded but the reflux liquid continues to flow down the column at the above mentioned rate.

As a modification of the process I have also found that improved results are obtained in contacting gases or vapours with liquids in columns which are packed with filling bodies made from woven material, the said filling bodies being other than in the form of hollow filling bodies, if the hereinbefore defined methods of flooding are applied to the said columns.

The process of the present invention may be applied to the treatment of gases or vapours with liquids in columns packed with, for example, so called Berl saddles made from woven material or flat fragments of woven material which may be twisted into a propeller-like shape or bent into a curved cross-section. Further examples of suitable filling bodies are those made from strips of woven material which are formed into a helix or a form analogous to a spiral staircase, that is in the form of step-wise ascending spirals, and which have diameters substantially equal to that of the column in which they are to be used. Examples of filling bodies according to this feature of the invention are described in "Industrial and Engineering Chemistry" Analytical Edition, at the following places, Lecky and Ewell 12 (1940) pages 545–547; Bower and Cooke 15 (1943) pages 290–293.

The process of the present invention is also applicable to those types of column packed with hollow filling bodies made from woven materials, which bodies are not freely packed as hereinbefore defined, for example improved results are obtained by applying the process to columns packed with the filling bodies described in British specification No. 536,552.

Furthermore, improved results are obtained by the application of the process of the present invention to columns random packed or systematically packed with lengths of filamentous material such as glass wool, slag wool or wire, which may be bent or twisted into regular or irregular geometrical forms, for example into helices, or when the filamentous material is in short lengths it may be sent into single turn helices or into uniplanar forms such as rings or polygons. When filamentous material is packed irregularly in a column the individual filaments intertwine with adjacent filaments and/or with parts of themselves to give a mass of packing having a large number of interstices. This is particularly the case where short lengths of filamentous material which are bent or twisted are used. An example of short lengths of filamentous material bent into single-turn helices for use as a packing material is described by Fenske in "Industrial and Engineering Chemistry" 26 (1934) page 1169, while examples of long filaments formed into a regular geometrical shape are described by Podbielniak in "Industrial and Engineering Chemistry" Analytical Edition 13 (1941) pages 639 to 645. While deflooding columns packed with such filamentous material, and subsequent thereto, liquid should be introduced continuously at the top of the column at a rate sufficient to maintain the operation of the column at its highest efficiency at the desired gas or vapour velocity up the column.

This liquid rate is easily determined by simple preliminary tests.

We have also found that the process of the present invention is particularly advantageous when applied to columns packed with fragments of material having a foraminate structure such as pumice and expanded shale, which preferably is in fragments of such a size that they are freely packed as hereinbefore defined. When using foraminate material as a column packing, it is necessary, while deflooding the column and subsequent thereto, to introduce liquid continuously at the top of the column at a rate sufficient to maintain the operation of the column at its highest efficiency, at the gas or vapour velocity up the column which it is desired to use. This rate of liquid is easily determined by simple preliminary tests. It should be understood that it is desirable to avoid the use of foraminate material which is liable to be attacked by any of the gases, vapours or liquids to be used in the column.

Figure 3:
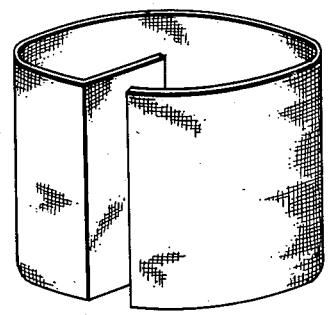
Figure 4:
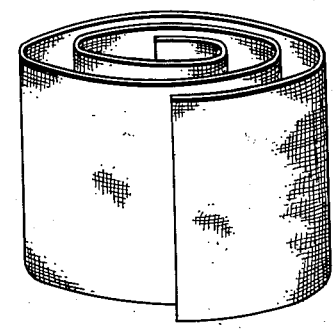
Figure 5:
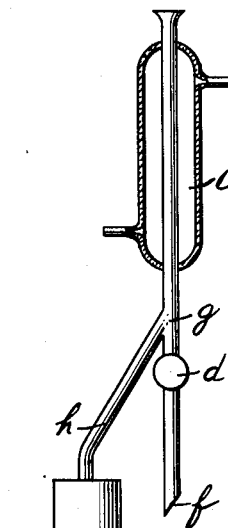

Figures 1, 2, 3 and 4 illustrate the shapes of hollow filling bodies made from woven material and Figure 5 one form of apparatus suitable for use in the process of the present invention. As hereinbefore stated these filling bodies are made from woven material, but for clarity the individual threads of the woven material are not shown in the drawings. Figure 6 illustrates the results obtainable from a distillation column operated according to the process of the present invention.

Figure 2:
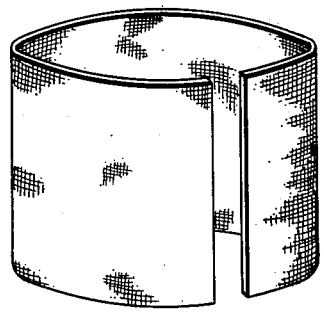

Figure 1 shows an open-ended cylinder, Figure 2 shows an open-ended cylinder with a longitudinal gap in its wall, Figure 3 shows an open-ended cylinder with a longitudinal gap in its wall and an inner partition, and Figure 4 shows a strip of woven material wound into an open spiral.

The filling bodies made from woven material may be produced from a wide variety of materials, for example, wire gauze, or from cloth woven from synthetic resins, textiles, asbestos, slag wool or glass wool; when the material used is not sufficiently rigid to form mechanically strong filling bodies, a support frame for example of wire may be provided. We prefer, however, to use filling bodies made from wire gauze such as copper gauze. More particularly we prefer to use a wire gauze having in the warp and/or weft not less than 30 wires per inch spaced apart by not more than 0.022 inch. A wire gauze having substantially the same number of wires in the warp and weft is particularly suitable for use according to the present invention, and it is preferred that in such gauze the distance between adjacent parallel wires is between 0.0050 inch and 0.0075 inch.

The filling bodies made from woven material may be produced in a wide variety of shapes but when hollow filling bodies are to be used, for ease of manufacture it is preferred to use those having the shapes illustrated in Figures 1 to 4, although it should be understood that the process of the present invention is not limited to the use of hollow filling bodies having these shapes.

When hollow cylindrical filling bodies with or without longitudinal gaps and/or longitudinal partitions or open spiral-form filling bodies are used, they may suitably have their lengths equal to their maximum width. For the best efficiencies their length and maximum width should preferably not be greater than ¼ inch.

While the process of the present invention is applicable to various processes in which intimate contact between fluids and liquids is desired, for example, in gas washing and absorption processes, it is particularly suitable for use in distillation processes. Thus in distillation processes using columns random packed with open-ended solid walled cylinders ⅛ inch by ⅛ inch, the number of theoretical plates per foot of column length, as calculated by the method referred to by Lecky and Ewell in "Industrial and Engineering Chemistry," Analytical Edition, 1940, page 544, is usually about 3 to 5, whereas, with the process of the present invention values of 40 theoretical plates per foot of column length have been obtained in columns 1½ inches in diameter when freely packed with hollow filling bodies made from woven material.

Tests on distillation apparatus operating according to the process of the present invention have shown that with comparable vapour velocities, better efficiencies are obtained than with distillation apparatus as hitherto operated. When using hollow filling bodies which are freely packed, these efficiencies are accompanied by unusually low liquid hold-up per theoretical plate and by very low pressure drop in the column.

Figure 5 illustrates a distillation apparatus suitable for use according to the process of the present invention. $a$ is a column freely packed with hollow filling bodies made from woven material, the column being connected to the boiler $b$. The reflux condenser $c$ is connected to the column $a$ by limb $h$ of a Y piece $g$ while on the limb $f$ of Y piece $g$ is a valve $d$ by means of which samples of reflux liquor can be withdrawn through the limb $f$. Between the boiler $b$ and the column $a$ is an adjustable orifice $e$.

Example 1

Apparatus as hereinbefore described was tested as follows. A ¾ inch diameter column was packed for 36 inches of its length with open-ended cylindrical filling bodies $\frac{3}{32}$ inch by $\frac{3}{32}$ inch made from Phosphor bronze wire gauze having 100 wires per inch in the warp and in the weft. The greatest dimension of such a filling body is along its diagonal and is about 0.132 inch, giving, with the ¾ inch diameter column, a ratio of column cross section to greatest dimension of the filling bodies of 5.7, i. e. not less than 4:1. The column was attached to a boiler and both were surrounded by jackets through which steam was passed, whereby substantially adiabatic conditions were maintained in the distillation system.

A condenser was fitted to the top of the column. The liquid used was a binary mixture of normal heptane with methyl cyclohexane. After placing a suitable quantity of this liquid in the boiler the packing was completely flooded with liquid prior to testing by heating the boiler and partially closing an adjustable orifice just below the packing support, whereby liquid condensed in the column and flooded the packing. When flooding was complete the orifice was gradually opened to its fullest extent and testing was commenced, the efficiency of the column being determined by the method referred to by Lecky and Ewell in "Industrial and Engineering Chemistry" Analytical Edition 1940, page 544. The results obtained are shown in Figure 6.

The following further examples illustrate the improvement obtained by operating according to the present invention, as applied to distillation columns packed with various filling bodies, the test liquid used in all of the examples being a mixture consisting approximately of 20 parts by volume of n-heptane and 80 parts by volume of methyl cyclohexane. The efficiency of the column being investigated was determined by measuring the refractive indices of the test liquid at the commencement of the test and of the reflux liquid when the column was operating under steady conditions at 100% reflux rate, i. e. without withdrawing any substantial quantity of distillate. By applying the readings for the refractive indices to the chart given by Lecky and Ewell in "Industrial and Engineering Chemistry" Analytical Edition 12 (1940) at page 547, the number of theoretical plates in the column under consideration was determined. In the apparatus used in the following examples the distillation column was fitted to an electrically heated boiler and provided with a reflux condenser at the top. The column and boiler were fitted into a double-walled jacket to enable substantially adiabatic conditions to be maintained in the column and boiler.

Example 2

A distillation column, provided with the fittings above described was substantially filled with Berl saddles ¼ by ¼" made from Phosphor bronze wire gauze having 60 meshes to the inch. Sufficient test liquid was placed in the boiler and heating was applied to the boiler to give a distillation rate of 1400 mls. per hour, the packing of the distillation column receiving no preliminary flooding. The number of theoretical plates in the column was found to be equivalent to 3.9 theoretical plates per foot.

Using the same apparatus, with the column fitted at the bottom with an adjustable orifice, heating was applied to the boiler to give a distillation rate of 1400 mls. per hour and the adjustable orifice was partly closed so that the column became completely flooded with reflux liquid, as described under the hereinbefore described method "A." Then, while maintaining the same rate of heating, the adjustable orifice was gradually opened and the liquid in the column allowed to return to the boiler. The apparatus was kept in operation until steady conditions were obtained when the efficiency of the column was determined as above described. In this case, the number of theoretical plates in the column was equivalent to 10.7 theoretical plates per foot, i. e., an increase of 6.8 theoretical plates per foot.

*Example 3*

A distillation column 1 foot long by 1 inch internal diameter was fitted with packing as described in British patent specification No. 536,552, 28 pairs of cones made from stainless steel wire gauze having 100 meshes to the inch being fitted into the column. Without making special provision to flood the column, heat was applied to the boiler to give a distillation rate of 500 mls. per hour. The number of theoretical plates per foot was found to be 2.5.

The apparatus was allowed to cool and drain, and was then restarted, but applying heat at such a rate that the column flooded with liquid. The supply of heat was then cut down to give a distillation rate of 500 mls. per hour, and when steady conditions were attained, it was found that the number of theoretical plates in the column was 6.2.

After again allowing the column to cool and drain, the column was flooded by the use of an adjustable orifice as described above (method A), the heat input being sufficient to give a distillation rate of 500 mls. per hour and when steady conditions were attained the number of theoretical plates per foot of column was found to be 7.5, an increase of 5.0 theoretical plates per foot as compared with operation with no preliminary flooding, and an increase of 1.3 theoretical plates per foot when flooded by heating at a rate greater than that required for the distillation process.

*Example 4*

In this example a column 9 mm. internal diameter and 45 cms. long was provided with a packing of the type described by Bower and Cooke in "Industrial and Engineering Chemistry," Analytical Edition 15 (1943) pages 290 to 293, the packing being made from a strip of nickel wire gauze 9 mms. wide, whereby there was provided within the column a continuous passage for the vapour in a form analogous to a spiral staircase having 71 steps. After placing 100 mls. of test liquid in the boiler the column was flooded by the application of sufficient heat to the boiler. The heat input was then decreased to give a distillation rate of 150 mls. per hour. When steady conditions were attained, the efficiency of the column was equivalent to 9.8 theoretical plates per foot.

The apparatus was then allowed to cool and drain, and was then flooded by method "B" hereinbefore described, using a heat input sufficient to give a distillation rate of 150 mls. per hour. The quantity of liquid in the apparatus was such that when boiling, it completely filled the boiler and distillation column. Then, without altering the heat input, liquid was gradually removed from the boiler until about 100 mls. remained. When steady conditions were attained, it was found that the number of theoretical plates in the column was equivalent to 11.6 per foot.

*Example 5*

The column used in this series of tests was 3 feet long and had an internal diameter of ¾ inch. It was packed with single turn helices made from wire 0.005 inches in diameter, the helices having a diameter of $\frac{1}{14}$ of an inch.

Single turn helices of this type are described by Fenske et al. in "Industrial and Engineering Chemistry" 26 (1934) at page 1169. Using a distillation rate of 750 mls. per hour and without any preliminary wetting the number of plates in the column was equivalent to 10.0 plates per foot. When the packing was flooded by applying heat to the boiler at a rate greater than that which was used for the distillation the number of theoretical plates in the column was equivalent to 16.0 per foot, while when the packing was flooded by the use of an adjustable orifice as described under method "A" hereinbefore given, the number of theoretical plates in the column was equivalent to 21.5 per foot.

*Example 6*

A column 2 feet long and 1½ inches in diameter was packed with fragments of expanded shale which passed through a ¼ inch mesh sieve but were retained on an ⅛ inch sieve. Using a distillation rate of 1400 mls. per hour and with no preliminary wetting of the packing the number of theoretical plates in the column was equivalent to 2.4 plates per foot. When the packing was flooded by applying heat to the boiler at a rate greater than that which was used for the distillation, the number of theoretical plates in the column was equivalent to 5.4 plates per foot, while when the packing was flooded by the use of an adjustable orifice as described under method "A" hereinbefore given, the number of theoretical plates in the column was equivalent to 5.9 plates per foot.

In the appended claims the term "gaseous" is used to designate both substances which are gaseous under normal conditions of temperature and pressure and normally liquid substances in vapourized form.

I claim:

1. In a process for the distillation of liquids in a distillation column fitted at the top with a reflux condenser, at least part of the said distillation column being packed with substantially hollow filling bodies made from wire gauze, the apertures of the wire gauze being of such a size that they can be completely sealed by the liquid under the operating conditions, the ratio of the smallest cross-sectional dimension of the packed portion of the column to the greatest dimension of the filling bodies at that cross section being at least 4 to 1, the steps of passing the vapour of the liquid being treated from a boiler through a constriction into the distillation column, condensing the vapour in the said reflux condenser, returning the condensed liquid to the distillation column where it is prevented from returning to the boiler by the constriction, until the freely packed portion of the column is filled with liquid, adjusting the flow of condensed liquid returning to the column from the reflux condenser to an amount sufficient to maintain the apertures of the filling bodies completely sealed, opening the constriction so that excess liquid returns to the boiler and maintaining the rate of flow of the vapour up the column sufficiently low not to break said sealing.

2. In a process for the distillation of liquids in a distillation column fitted at the top with a reflux condenser, at least part of the said distillation column being packed with filling bodies made from wire gauze, the apertures of the wire gauze being of such a size that they can be completely sealed by the liquid under the operating conditions, the steps of passing the vapour of the liquid being treated from a boiler through a constriction into the distillation column, condensing the vapour in the said reflux condenser, returning the condensed liquid to the distillation column where it is prevented from returning to the boiler by the constriction, until the packed portion of the column is filled with liquid, adjusting the flow of condensed liquid returning to the column from the reflux condenser to an amount sufficient to maintain the apertures of the filling bodies completely sealed, opening the constrictions so that excess liquid returns to the boiler, and maintaining the rate of flow of the vapour up the column sufficiently low not to break said sealing.

3. In a process for the distillation of liquids in a distillation column fitted at the top with a reflux condenser, at least part of the said distillation column being packed with foraminate material, the foramina of said material being of such a size that they can be completely sealed by the liquid under the operating conditions, the ratio of the smallest cross-sectional dimension of the packed portion of the column to the greatest dimension of the filling bodies at the cross section being at least 4 to 1, the steps of passing the vapor of the liquid being treated from a boiler through a constriction into the distillation column, condensing the vapor in the said reflux condenser, returning the condensed liquid to the distillation column where it is prevented from returning to the boiler by the constriction, until the freely packed portion of the column is filled with liquid, adjusting the flow of condensed liquid returning to the column from the reflux condenser to an amount sufficient to maintain the apertures of the filling bodies completely sealed, opening the constriction so that excess liquid returns to the boiler and maintaining the rate of flow of the vapor up the column sufficiently low not to break said sealing.

4. In a process for the distillation of liquids in a distillation column fitted at the top with a reflux condenser, at least part of the said distillation column being packed with foraminate material, the foramina of said material being of such a size that they can be completely sealed by the liquid under the operating conditions, the steps of passing the vapor of the liquid being treated from a boiler through a constriction into the distillation column, condensing the vapor in the said reflux condenser, returning the condensed liquid to the distillation column where it is prevented from returning to the boiler by the constriction, until the packed portion of the column is filled with liquid, adjusting the flow of condensed liquid returning to the column from the reflux condenser to an amount sufficient to maintain the apertures of the filling bodies completely sealed, opening the constrictions so that excess liquid returns to the boiler, and maintaining the rate of flow of the vapor up the column sufficiently low not to break said sealing.

5. In a process for the distillation of liquids in a distillation unit having a distillation column operated under reflux and having at least a part thereof packed with foraminate material possessing foramina of such size that they can be completely sealed by the distilled liquid under operating conditions, the steps of flooding the column, deflooding the column and flowing vaporized liquid up the column, the maximum rate of said vapor flow at no time during the entire process being permitted to substantially exceed the rate employed in normal operation with the column in equilibrium, said flooding being accomplished by restricting the flow of reflux at a point below said packed section of said column while distilled vapors are allowed to pass up the column into the packed section from beneath said point and said deflooding being accomplished by discontinuing said restriction of the reflux flow after sufficient liquid has accumulated in the packed section of the column to flood the same.

OLAF GEORGE DIXON.

REFERENCES CITED

The following references are of record in the file of this patent:

UNITED STATES PATENTS

| Number | Name | Date |
| --- | --- | --- |
| 2,208,573 | Fenske | July 23, 1940 |
| 2,317,101 | Lecky | Apr. 20, 1943 |

OTHER REFERENCES

Publication, Industrial and Engineering Chemistry, vol. 15, pages 290 to 293, April 15, 1943.